(12) United States Patent
Palm et al.

(10) Patent No.: US 7,351,329 B2
(45) Date of Patent: Apr. 1, 2008

(54) POTABLE WATER STATION SANITIZING SYSTEM AND METHOD

(75) Inventors: Joseph M. Palm, Lombard, IL (US); Loren H. Semler, Franklin Park, IL (US); William E. Schulz, Palatine, IL (US)

(73) Assignee: Semler Industries, Inc., Franklin Park, IL (US)

( * ) Notice: Subject to any disclaimer, the term of this patent is extended or adjusted under 35 U.S.C. 154(b) by 398 days.

(21) Appl. No.: 10/989,222

(22) Filed: Nov. 15, 2004

(65) Prior Publication Data

US 2005/0103726 A1    May 19, 2005

Related U.S. Application Data

(60) Provisional application No. 60/520,467, filed on Nov. 14, 2003.

(51) Int. Cl.
    *C02F 1/78* (2006.01)
(52) U.S. Cl. .................. 210/96.1; 210/153; 210/167.3; 210/172.1; 210/192; 210/195.1; 210/205; 210/241; 210/416.3; 210/418

(58) Field of Classification Search ............... 210/96.1, 210/167.01, 192, 198.1, 205, 241, 416.1, 210/416.3, 418, 760, 153, 167.3, 172.1, 195.1; 422/3, 29, 32
See application file for complete search history.

(56) References Cited

U.S. PATENT DOCUMENTS

| | | | | |
|---|---|---|---|---|
| 5,598,316 A | * | 1/1997 | Kasting, Jr. | ................. 361/212 |
| 5,772,871 A | * | 6/1998 | Lyon et al. | ............ 210/167.02 |
| 2003/0049164 A1 | * | 3/2003 | Bon et al. | ..................... 422/28 |

* cited by examiner

*Primary Examiner*—Matthew O. Savage
(74) *Attorney, Agent, or Firm*—Marshall, Gerstein & Borun LLP

(57) ABSTRACT

A system for sanitizing a potable water station includes a pair of conduits providing a fluid connection between the potable water station and the system. It also includes a pump operable for circulating water from the potable water station through one of the conduits to the system and through the other of the conduits from the system to the potable water station. Further, the system includes an ozone generator for injecting ozone into the circulating water to destroy bacterial contamination. A method for sanitizing a potable water station includes the step of circulating water from the potable water station and back to the potable water station. It also includes the step of generating ozone with an ozone generator. Further, the method includes the step of injecting ozone into the water circulating from and back to the potable water station.

5 Claims, 1 Drawing Sheet

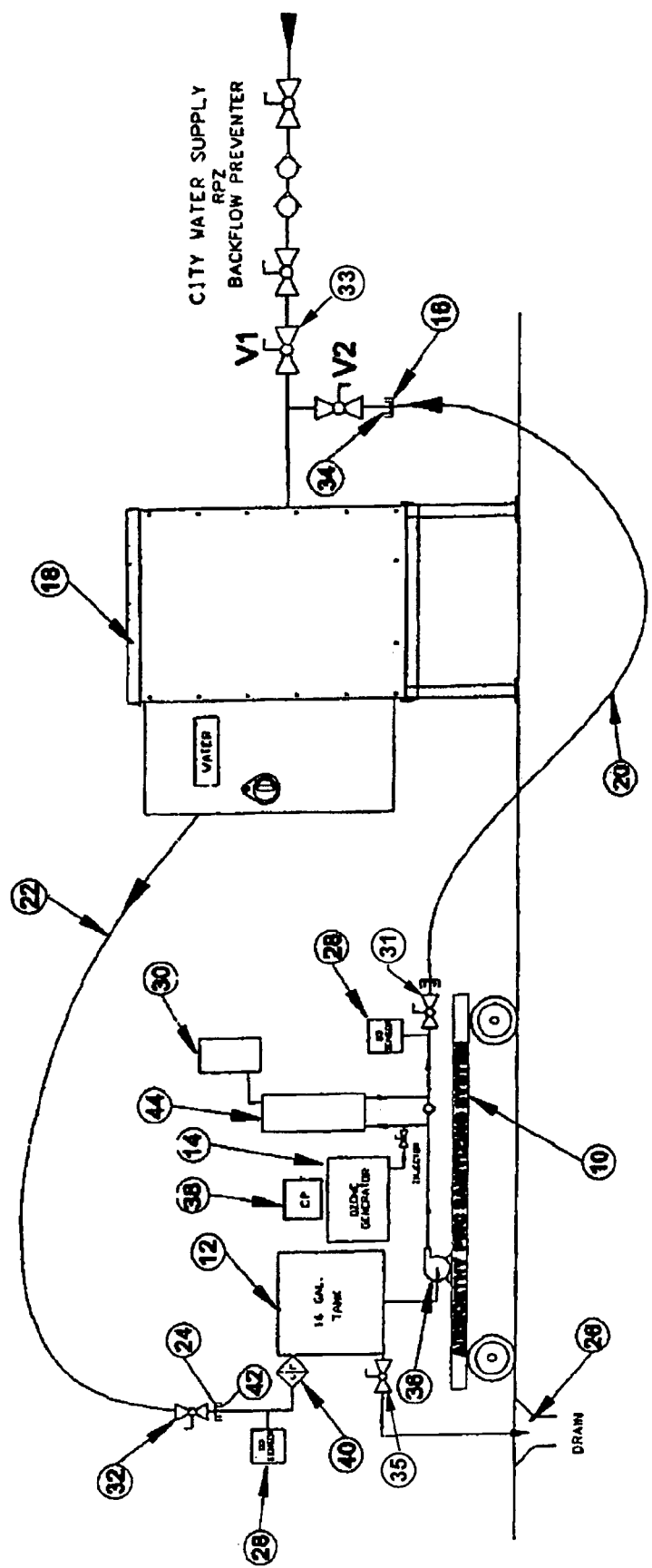

POTABLE WATER STATION SANITIZING SYSTEM AND METHOD

RELATED APPLICATION DATA

This application claims priority to now abandoned U.S. provisional application Ser. No. 60/520,467 filed on Nov. 14, 2003.

FIELD OF THE INVENTION

The present invention is generally directed to ensuring against contaminants in potable drinking water and, more particularly, to a system and method for sanitizing a potable water station to ensure against contaminants in water contained therein.

BACKGROUND OF THE INVENTION

Potable (drinking) water is commonly found in large commercial transport vehicles such as aircraft, railroad passenger cars, buses, boats and ships. Such water is placed on board these transport vehicles for use as drinking water, making ice cubes, culinary, cleaning and other sanitary purposes. Care must be taken to assure that harmful bacteria and organisms are not present and/or multiplying in the water found inside the potable water storage and distribution systems in these conveyances. Some organisms can live and multiply very rapidly under certain conditions. Most frequently cited to be of concern are coliform, *E.coli*, and *legionella*, but other common bacteria in domestic water supplies in the United States, Canada, and other countries include, but are not limited to, *salmonella typhia, shingella sonnei*, dysenteria, flexneri, boydii, *vibro cholerae, campylobacter jejuni, yersinia enterocolitica, plesiomonas shigellojodes*, and *aeromonas hydrophila*. Therefore, care is needed in the treatment and handling of water intended for such uses.

Within the United States, the Environmental Protection Agency has a responsibility for regulatory enforcement of the Safe Water Drinking Act of 1974. The Act covers, among other things, municipal drinking water supplies and other water supplies being used by the public. Other politically stable and economically developed countries have similar agencies with similar responsibilities. It is recognized by these agencies that it is economically impossible to provide absolutely pure water. There are, however, achievable, appropriate, and economical limits to the concentration of chemical, mineral, and organic contaminants. These contaminant concentrations are very low and generally do not represent a health threat to the general population.

Most of the watering points used to transfer water into the transport are filled using municipal, and otherwise regulated, treated public water supplies. Acceptably low concentrations of some offensive organisms are routinely introduced into watering points and consequently could find their way into the transport's potable water storage tank(s). Given the right conditions, these offensive organisms can grow and multiply and develop higher concentrations that can be harmful to otherwise strong and healthy people. These organisms can also form biofilms within watering points and a transport's potable water storage tank(s). Such biofilms can re-contaminate watering points and the transport's potable water storage tank(s) even after they have been emptied, flushed, and refilled.

One method for filling a storage tank(s) in a transport's potable water system is the utilization of a potable water station which may take the form of a potable water cabinet (PWC). The PWC is essentially a cabinet containing piping, hose, hose reels, and other components compatible with drinking water that are used to convey water from the water supply into the transport's potable water storage tank(s).

The conventional method of cleaning the PWC's relates to the EPA's recommended procedure for the sterilization of watering points which generally conforms to the following description:

1. Prepare the chlorine solution at a concentration of 5.25% chlorine bleach having no additives. It is best to prepare a volume more than the internal volume of the water point.
2. Pump the solution into the piping of the watering point in a rapid, continuous flow.
3. Continue pumping until the odor of the chlorine is detected at the discharge nozzle.
4. Attach the discharge nozzle to the suction side of the pump used to fill the watering point and recirculate the chlorinated water within the watering point for at least one hour.
5. Stop the pump and allow the chlorine solution to remain within the plumbing of the watering point for at least 1 to 4 hours. Flush the entire system until it is free of chlorine and dispose of the chlorinated water in compliance with hazardous waste rules.
6. This process may be repeated. For some difficult infestations a higher concentration of chlorine or use of hot water or steam may be required to disperse slime and kill bacteria.

Difficulties have been encountered using this method due to: the complexities of transporting and mixing chemicals; the requirements with respect to safety goggles, safety aprons; gloves, etc. (in compliance with OSHA Regulations); the total time required; the exposure time required to effectively disinfect the PWC's wetted internals (hose, valves, piping, and couplings); the post-cleaning complete flushing of the PWC's wetted internals to eliminate the chemicals; and the proper disposal of the waste of the used chemicals flushed from the system (in accord with EPA Regulations).

SUMMARY OF THE INVENTION

The potable water station sanitizing system and method which is disclosed herein utilizes an alternate disinfectant; namely, ozone in water at concentrations up to a maximum of 4.0 mg/l in drinking water (4 parts per million) which is cited by the EPA as being safe.

It has been reported that concentrations of chlorine of around 5 parts per million can cause respiratory complaints, corrosion of the teeth, inflammation of the mucous membrane of the nose, and increased susceptibility to tuberculosis. Ozone has been cited safe by the EPA and studies show that ozone has over 3,000 times the disinfecting power of chlorine.

The system for sanitizing a potable water station includes a pair of conduits providing a fluid connection between the potable water station and the system. It also includes a pump operable for circulating water from the potable water station through one of the conduits to the system and through the other of the conduits back to the potable water station. Further, the system includes an ozone generator for injecting ozone into the circulating water to sanitize the potable water station.

The method of sanitizing a potable water station includes the step of circulating water from a potable water station and back to the potable water station. It also includes the steps of generating ozone with an ozone generator and injecting ozone into the water. The method may further include the step of draining water flushed from the potable water station into a storage tank and/or a sanitary drain.

BRIEF DESCRIPTION OF THE DRAWING

The accompanying drawing FIGURE illustrates a potable water station sanitizing system in accordance with the present invention.

DETAILED DESCRIPTION OF THE PREFERRED EMBODIMENT

With reference to the accompanying drawing FIGURE, the potable water station sanitizing system disclosed herein consists of a portable cart 10 containing a tank 12, an ozone generator 14, a hose or conduit 20, a hose or conduit 22, two ozone sensors 28, an ozone destructor 30, an electric motor driven pump 36, a control panel 38, a carbon filter 40, and an ozone mixing tower 44 along with other components that will be discussed hereinafter.

The system for sanitizing a potable water station will therefore be understood to include the pair of conduits or hoses 20 and 22 providing a fluid connection with the potable water station or cabinet (PWC) 18. It also includes the pump 36 which is operable for circulating water from the PWC 18 through one of the conduits or hoses 22 to the system and for circulating water from the system through the other of the conduits or hoses 20 back to the PWC 18. Additionally, the system includes the ozone generator 14 which is provided to inject ozone into the water circulating from the PWC 18, through the system, and back again to the PWC 18 to sanitize the PWC 18.

As shown, the system is provided on the portable cart 10 for transporting the system to and from the PWC 18 for sanitizing the PWC through the ozone-injected circulating water. There is also at least one control valve such as valves 31 and 32 associated with each of the conduits or hoses 20 and 22, respectively, for controlling the circulation of water through the conduits or hoses 20 and 22. Further, the system includes a controller in the ozone generator 14 for controlling the level of ozone injected into the circulating water by the ozone generator 14 as the water passes through the mixing tower 44.

The system utilizes the two ozone sensors 28 for the purposes of determining when the ozone concentration in the water circulating to and from the PWC 18 is correct and approximately equal. The pump 36 is selectively operable to circulate water when the water inlet valve 33 is closed, and the ozone generator 14 injects ozone into the circulating water passing through the mixing tower 44 only during operation of the pump 36. Further, the system includes a storage tank 12 for receiving and temporarily storing water from the PWC 18 following operation of the pump 36 and opening of the water inlet valve 33.

As will be appreciated, the opening of the water inlet valve 33 causes flushing of the ozone-injected water in the PWC 18 through the one of the conduits or hoses 22 into the storage tank 12. The ozone-injected water can later be drained by opening the drain valve 35 connected to the storage tank 12 for draining the ozone-injected water in the storage tank after the PWC 18 has been sanitized and flushed.

With regard to operation of the potable water station sanitizing system, it generally operates in the following manner:

1. The system is connected to the potable water station, or PWC, 18 through a return conduit or hose 20 by joining the coupling 16 on the end of the hose 20 to the coupling 34 on the inlet side of the PWC 18. As will be seen, the coupling 34 is on the inlet side of the PWC 18, but it is downstream of a backflow preventer which is interposed in a water supply line.

2. The system is also connected to the PWC 18 through a discharge conduit or hose 22 by joining the coupling 24 on the end of the hose 22 to the coupling 42 on the system.

3. The system circulates water from the PWC 18 to its self-contained storage tank 12 and then back into the PWC 18, while injecting ozone from the ozone generator 14 into the mixing tower 44 then into the circulating water. It is believed to be preferable for the ozone to be injected at a preset level in a range between 0.1 and 2.0 mg/l [PPM] (typically 1.0 mg/l [PPM]). As the water, thus ozonated, travels through the PWC 18 and encounters harmful bacteria and organisms, it will deactivate the bacteria and organisms and no longer comprise ozone in its molecular form.

4. The water returning to the system through the conduit or hose 22 is monitored by an ozone sensor 28 just upstream of the optional carbon filter 40 to measure the ozone concentration level. It will be appreciated that the ozone generator is injecting ozone into the circulating water at a point between this ozone sensor and a second ozone sensor 28 adjacent the point where the conduit or hose 20 is attached to the system. After a period of time, the two sensors 28 will determine that the concentration of ozone in the circulating water entering the PWC 18 will be approximately equal to the concentration of ozone in the circulating water returning to the system from the PWC 18. When the ozone concentrations are determined by the two sensors to be approximately equal, it will be an indication that all of the harmful bacteria and organisms in the PWC 18 have been successfully deactivated.

5. After successful deactivation of all of the harmful bacteria and organisms in the PWC 18, the conduit or hose 20 is disconnected from the PWC 18 by disconnecting the couplings 16 and 34.

6. The PWC 18 is then flushed with water which typically contains residual chlorines that will assist in preventing organic regrowth. This causes any water in the PWC 18 that had been circulated by the system to be flushed into the storage tank 12 where it is received and temporarily held for discharge into a drain such as 26. The water from the water supply is used to fill the PWC 18 where it is then available for use as potable water.

7. When PWC 18 is full, the discharge hose 22 of the PWC 18 is uncoupled from the system. As mentioned, water flushed from the PWC 18 will therefore reside temporarily within the tank 12. The tank 12 is sized to assure that the PWC 18 has been completely flushed by the water from the public water supply.

8. The portable cart 10 carrying the system is then relocated to the nearest sanitary sewer or storm sewer drain depending on local ordinances where the waste water in the tank 12 can be dumped into a drain 26 as "gray water" since it contains no residual hazardous chemicals.

9. The system is then ready for its next use.

From the foregoing description of the operation of the system, it will be understood that the coupling 24 on the conduit or hose 22 is connected to the coupling 42 just upstream of the optional carbon filter 40, following which the sixteen gallon storage tank 12 is filled with approximately one gallon of water to prime the system's pump 36. Next, the coupling 16 on the conduit or hose 20 is connected to the coupling 34 on the inlet side of the PWC 18. The water inlet valve V1 from the water supply is closed and valve V2 is opened. Next, the water nozzle valve 32 is opened and the electrical components are rendered operative by plugging the system into an appropriate electrical source. A "start" pushbutton at the control panel 38 is pushed to run the system for approximately six (6) minutes at a water circulation flow rate of approximately 5 GPM. Next, valve V2 is closed and the coupling 16 is uncoupled. The water inlet valve V1 is then opened to deliver water to the PWC 18 which causes the PWC to be flushed of the previously circulating water which travels to the storage tank 12 and filled with water. Next, the PWC water nozzle valve 32 is closed, the coupling 24 is uncoupled, and the conduit or hose 22 is rewound. Lastly, the cleaning is recorded, the cabinet doors on the PWC 18 are closed, and the portable cart 10 is moved to the nearest sanitary drain 26 to drain the storage tank 12 and piping until it is empty.

The foregoing describes the conduit or hose 22 as being associated with the PWC 18 and the conduit or hose 20 being associated with the system, but it will be understood and appreciated that it is only necessary for sanitizing a potable water station that there be two conduits or hoses. One of the conduits or hoses will define a first flow path for water to flow from the PWC 18 to the system while the other of the conduits or hoses defines a second flow path for water to flow from the system back to the PWC 18. As a result, the conduits or hoses 20 and 22 can be provided with appropriate couplings so that they can both remain with the PWC 18, both remain with the system, or one can remain with the PWC 18 and the other can remain with the system when it is not being used to sanitize the potable water station Since no hazardous chemicals are used, the invention eliminates the need to use safety equipment associated with hazardous chemicals, the need to mix and introduce chemicals, and the need to dispose of hazardous waste. Since ozone is a radical $O^3$ molecule and is inherently unstable it will return to its natural state (an ordinary oxygen molecule) in a short time depending on temperature and other factors. Thus, there is an absence of any residual waste chemicals. Furthermore, since ozone's bacterial kill rate is over 3,000 times faster than chlorine, the cleaning time required for each PWC is significantly reduced when compared to conventional chemical cleaning.

In the foregoing specification, a detailed description of the present invention has been set forth although it will be appreciated by those skilled in the art that the details herein given may be varied without departing from the true spirit and scope of the appended claims.

What is claimed is:

1. In a potable water station containing drinking water from a public drinking water supply where the potable water station is connected to the public drinking water supply through a water inlet valve, the improvement comprising:

a system for sanitizing the potable water station using the drinking water contained therein, the system comprising:

a pair of conduits for selectively providing fluid connections between the potable water station and the sanitizing system;

a pump for continuously circulating the drinking water contained in the potable water station to and from the sanitizing system through the pair of conduits when the water inlet valve to the public drinking water supply is closed;

an ozone generator for injecting ozone into the drinking water to sanitize the potable water station as the drinking water contained in the potable water station is being circulated by the pump to and from the potable water station;

a tank for temporarily storing ozone injected drinking water following operation of the pump and opening of the water inlet valve to flush and refill the potable water station with drinking water from the public drinking water supply; and a drain valve connected to the tank for draining ozone injected drinking water temporarily stored in the tank after the potable water station has been sanitized, flushed and refilled with drinking water from the city water supply.

2. The potable water station and sanitizing system of claim 1, further comprising:

a portable cart for transporting the sanitizing system to and from the potable water station for sanitizing the potable water station using the drinking water contained therein.

3. The potable water station and sanitizing system of claim 1, further comprising:

at least one control valve associated with each of the conduits for controlling the circulation of the drinking water contained in the potable water station through the conduits.

4. The potable water station and sanitizing system of claim 1, further comprising:

a controller for controlling the level of ozone injected into the drinking water contained in the potable water station by the ozone generator as the drinking water is being circulated by the pump to and from the potable water station.

5. The potable water station and sanitizing system of claim 1, further comprising:

first and second sensors for determining when the ozone concentration in the drinking water being circulated by the pump to and from the potable water station is approximately equal.

* * * * *